United States Patent [19]

Honda

[11] Patent Number: 5,621,814
[45] Date of Patent: Apr. 15, 1997

[54] IMAGE RECOGNITION APPARATUS CAPABLE OF INSPECTING HEIGHT AND METHOD FOR INSPECTING HEIGHT BY USING TWO SLIT INCIDENT BEAMS OF LIGHT

[75] Inventor: Motoharu Honda, Shiga, Japan

[73] Assignee: NEC Corporation, Tokyo, Japan

[21] Appl. No.: 327,492

[22] Filed: Oct. 21, 1994

[30] Foreign Application Priority Data

Oct. 22, 1993 [JP] Japan ................................. 5-264454

[51] Int. Cl.$^6$ ........................................................ G06K 9/00
[52] U.S. Cl. ................................................ 382/152; 356/376
[58] Field of Search ..................................... 382/141, 145, 382/152, 154; 348/86, 87, 135; 356/237, 376, 377, 383; 364/562

[56] References Cited

U.S. PATENT DOCUMENTS

| | | | |
|---|---|---|---|
| 4,573,073 | 2/1986 | Corby, Jr. ........................... | 358/96 |
| 4,653,104 | 3/1987 | Tamura ............................... | 382/1 |
| 4,696,047 | 9/1987 | Christian et al. .................. | 382/8 |
| 4,731,853 | 3/1988 | Hata et al. ......................... | 382/1 |
| 5,243,405 | 9/1993 | Tichenor et al. .................. | 356/371 |
| 5,243,665 | 9/1993 | Maney et al. ...................... | 382/8 |
| 5,280,542 | 1/1994 | Ozeki et al. ....................... | 382/8 |

FOREIGN PATENT DOCUMENTS 63-37479  2/1988  Japan ............................. G06F 15/64

*Primary Examiner*—Andrew Johns
*Attorney, Agent, or Firm*—Foley & Lardner

[57] ABSTRACT

An image recognition apparatus with which rapid height discrimination can be performed for a large number of small protrudent objects disposed on a substrate, and further a height inspecting method with the use of the image recognition apparatus, are disclosed. Two slit incident beams having been emitted from an illuminant and passed through slits fall on an object to be inspected each at an incident angle from the direction perpendicular to the surface of the object to be inspected. There are irregularities of objects to be detected on the object to be inspected. The slit beams are intercepted by protrudent parts of the objects to be detected, so that the morphologies of bright lines produced on the surface of the object to be inspected are changed depending on the heights of the objects to be detected. An image of the bright lines is picked up by a television camera, and the resultant signal is compared with an image signal previously stored. Thus, whether or not the heights of the objects to be detected fall within a given range can be discriminated.

4 Claims, 8 Drawing Sheets

F I G. 11
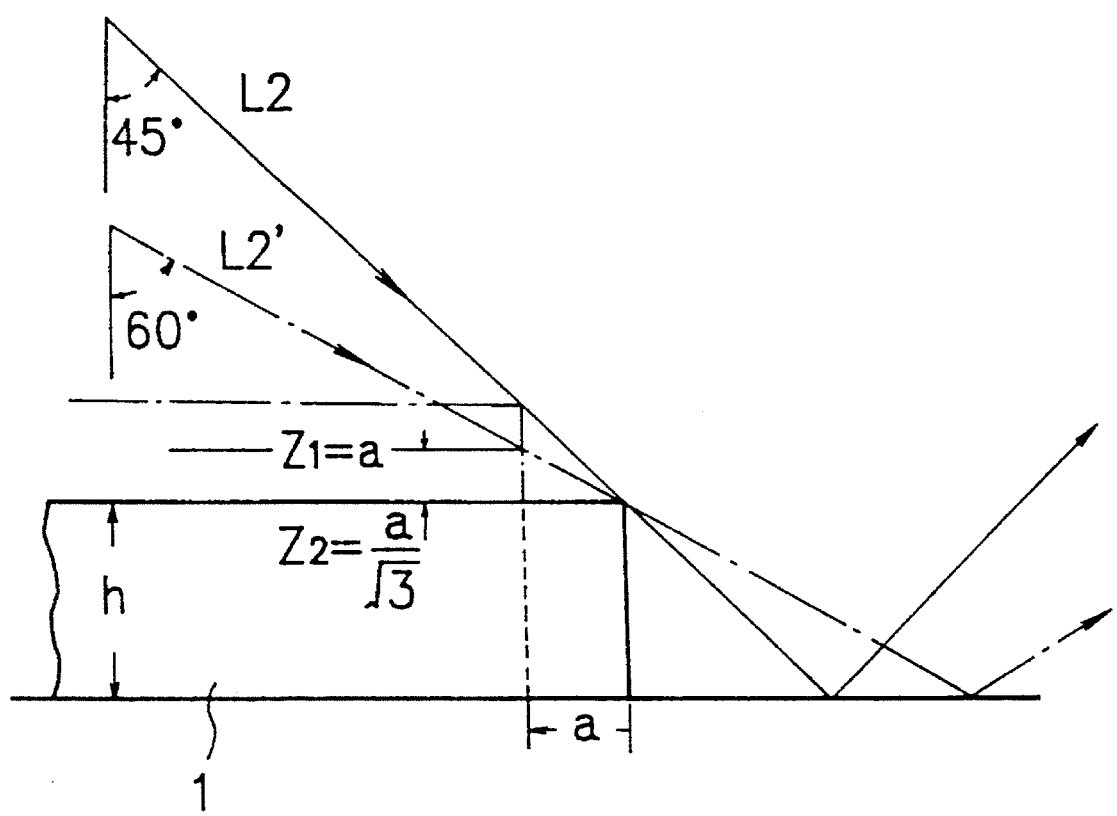

IMAGE RECOGNITION APPARATUS CAPABLE OF INSPECTING HEIGHT AND METHOD FOR INSPECTING HEIGHT BY USING TWO SLIT INCIDENT BEAMS OF LIGHT

BACKGROUND OF THE INVENTION

The present invention relates to an image recognition apparatus and to a method for measuring a height with the use of an image recognition apparatus. More particularly, the present invention is concerned with an image recognition apparatus with which an object to be detected, protrudently disposed on a substrate, such as a vamp electrode protrudently disposed on a semiconductor wafer, is detected by means of a television camera to thereby discriminate whether or not the height thereof falls within a given range, and also concerned with a method for measuring a height with the use of the above image recognition apparatus.

Description of the Related Art

In the above type of image recognition apparatus and height measuring method with the use of such an image recognition apparatus, conventionally, the arrangement and shape of an object to be detected are detected in image patterns. For example, as shown in FIG. 1, a substrate 52 having an object to be detected, 51 mounted thereon is irradiated with beams from an illuminant 53. A surface image of the irradiated substrate 52 is picked up by a television camera 54.

The resultant image signal is amplified by an amplification member 55, and the amplified image signal is compared by a comparison member 56 with a standard pattern signal stored in a memory 57. Thus, the arrangement and shape of the object to be detected 51, mounted on the substrate 52, are detected. An amplified image pattern of the substrate 52 can be visually checked on a display member 58. This apparatus is being utilized in various automatic assemblers and inspection devices.

For example, in the above conventional image recognition apparatus in which the substrate 52 is a printed substrate and the object to be detected 51 is a chip mounted on a conductive pattern 60 of the printed substrate, when there is no clear contrast between the chip and the conductive pattern 60, it is impossible to keep a manifest threshold value. Thus, clear discriminations cannot be effected thereby leading to faulty recognition, when the image signal fed from the television camera 54 is compared by the comparison member 56 with the standard pattern signal stored in the memory 57. Further, it is difficult to detect the dimension of the height of the object to be detected 51, because the pickup of the surface image of the substrate 52 by the television camera 54 is performed from upward in this image recognition apparatus. Especially, when the object to be detected 51 is a small protrudent material, such as a vamp electrode for use on a semiconductor wafer, it is mostly impracticable to detect the dimension of the height thereof.

Therefore, an image recognition apparatus has been proposed in which a light screen 63 having one slit 62 formed therein is disposed in front of an illuminant 53 so as for a slit beam L to obliquely fall incident on a printed substrate 59, and in which the continuity or discontinuity of a bright line M produced by the slit incident beam L falling on the upper surfaces of a chip 61 and the printed substrate 59 is discriminated to thereby detect the chip 61, as shown in FIG. 2 (Japanese Patent Laid-open Publication No. 63 (1988)-37479).

When this apparatus is employed, the bright line M of the image picked up by a television camera 54 exhibits discontinuity at the border of the printed substrate 59 and the chip 61 as shown in FIG. 3, so that the image can clearly be discriminated. Further, the slit incident beam L falls on the printed substrate 59 at an incident angle of a as shown in FIG. 4, with the result that the bright line position Ma on the chip 61 is dislocated as much as d=h×tan a (wherein h represents the height of the chip 61) to the illuminant side from the bright line position Mb on the printed substrate 59. Therefore, the height of the chip 61 can be determined by measuring the length of the discontinuity of the bright line, d.

In the above image recognition apparatus in which an object to be detected, protrudently disposed on a substrate is irradiated with a slit beam oblique with respect to the substrate to thereby detect the dislocation of a bright line position, the detection of the object to be detected is performed on the basis of the magnitude of the dislocation of the bright line position, so that the apparatus can be free from problems regarding the contrast of the image pattern of the object to be detected on the substrate and also regarding the detection of the dimension of the height of the object to be detected. However, when a large number of small protrudent materials are disposed on a substrate like vamp electrodes disposed on a semiconductor wafer and when whether or not the heights of the small protrudent materials are within a given range is discriminated, the discrimination is necessary for a long time due to the search of the bright line in a two dimensional area corresponding to the range of height variation and due to the processing and calculations of the magnitude of the dislocation of the bright line position.

SUMMARY OF THE INVENTION

The object of the present invention is to provide an image recognition apparatus capable of rapidly performing height discrimination for a large number of small protrudent materials disposed on the substrate, and further to provide a method for inspecting a height with the use of the image recognition apparatus.

For attaining the above object, the image recognition apparatus of the present invention as claimed in claim 1 comprises:

illuminant means for emitting irradiation beams, slit means for converting the irradiation beams to two mutually parallel slit indcident beams obliquely falling on an object to be inspected, the slit means being disposed in front of the illuminant means, image pickup means for picking up an image of bright lines produced by the slit beams on a surface of the object to be inspected, and image processing means for comparing a signal of the image picked up by the image pickup means with a given pattern signal previously stored, and wherein the object to be inspected is provided with a protrudent object to be detected whose height is discriminated on the basis of whether there are any breaks caused by the protrudent object to be detected in the bright lines.

More desirable results are obtained when the image recognition apparatus further comprises a cylindrical lens disposed in front of the image pickup means, the cylindrical lens being adapted to enlarge the image of the bright lines produced on the object to be inspected along the width direction thereof.

Further, height discrimination with higher resolution can be conducted when the magnitude of the height of the object to be detected is calculated on the basis of the magnitude of the interval between a bright line on the object to be inspected and the bright line on the object to be detected.

The image recognition apparatus of the present invention as claimed in claim 4 comprises:

object-to-be-inspected supporting means provided with a rotatable stage having an object to be measured superimposed thereon.

illuminant means for emitting a slit incident beam falling on the object to be inspected at a given incident angle, image pickup means for picking up an image of a bright line produced by the slit beam on the object to be inspected, and image processing means for comparing a signal of the image picked up by the image pickup means with a given pattern signal previously stored in respect of the relationship between the presence or absence of the bright line and the incident angle, and wherein the object to be inspected is provided with a protrudent object to be detected whose height is discriminated on the basis of the magnitude of the interval between the bright line on the object to be inspected and that on the object to be detected, while identification of the object to be detected is effected on the basis of the position of rotation of the stage.

It is preferred that the image recognition apparatus be so formed as to permit a relative movement of the object-to-be-inspected supporting means and/or the illuminant means. Also, it is preferred that the stage be rotatable at an angle of about 90° around the image pickup means.

The method for inspecting a height with the use of an image recognition apparatus according to the present invention as claimed in claim 7, comprises:

an illumination step of emitting irradiation beams, a slit beam emitting step of converting the irradiation beams to two mutually parallel slit incident beams obliquely falling on an object to be inspected with the use of a slit being disposed in front of the illuminant, an image pickup step of picking up an image of bright lines produced by the slit beams on a surface of the object to be inspected, and an image processing step of comparing a signal of the image picked up in the image pickup step with a given pattern signal previously stored, and wherein the object to be inspected is provided with a protrudent object to be detected whose height is discriminated on the basis of whether there are any breaks caused by the protrudent object to be detected in the bright lines.

BRIEF DESCRIPTION OF THE DRAWINGS

FIG. 11 is a view for illustrating the mechanism of the image recognition apparatus of FIG. 10.

PREFERRED EMBODIMENTS OF THE INVENTION

A form of the image recognition apparatus of the present invention and also a mode of the method for inspecting a height with the use of the image recognition apparatus according to the present invention will be described in greater detail with reference to the appended drawings. The above description will be made by referring specifically to FIGS. 5 to 11.

Figure 1:
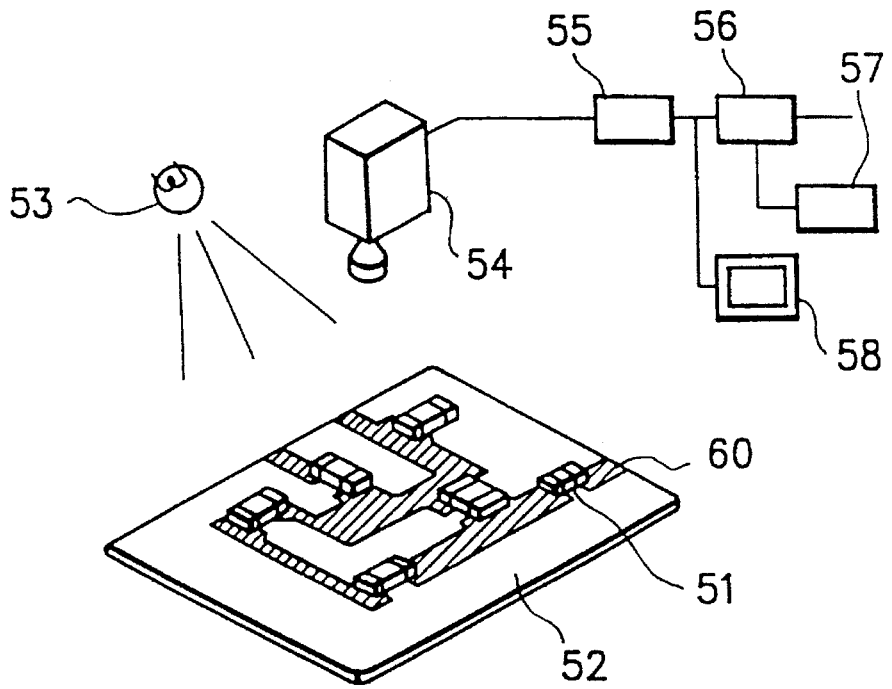
FIG. 1 is a schematic diagram of the architecture of a conventional image recognition apparatus.
Figure 2:
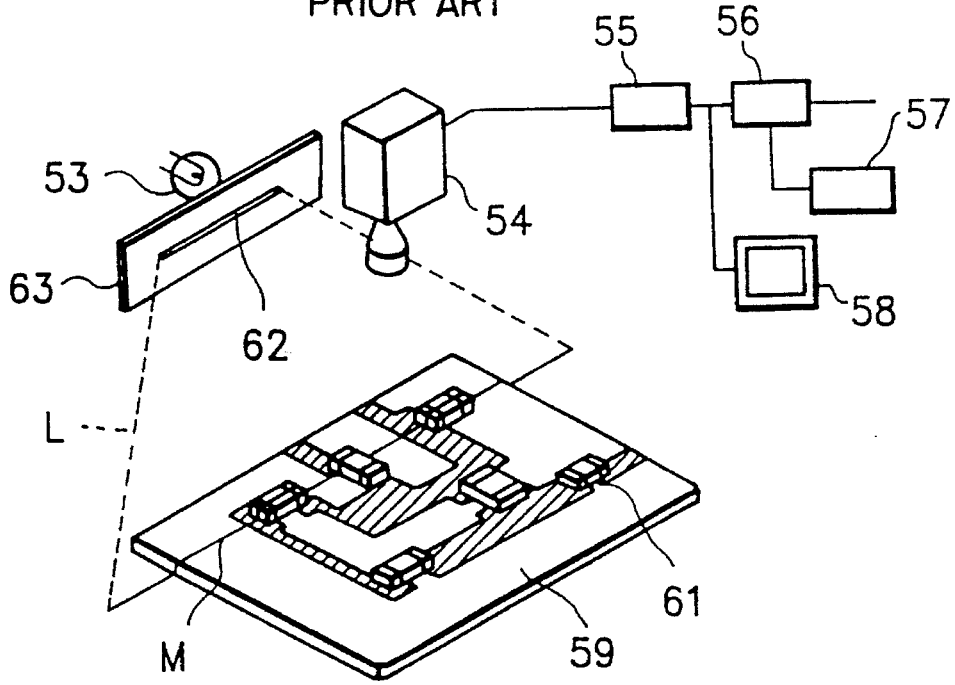
FIG. 2 is a schematic diagram of the architecture of another conventional image recognition apparatus.
Figure 3:
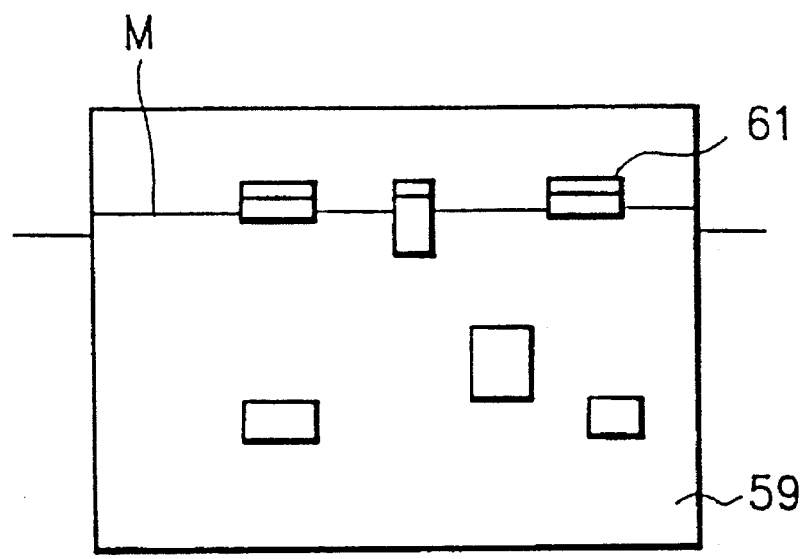
FIG. 3 is a schematic diagram for illustrating the procedure for measuring a height with the use of the image recognition apparatus of FIG. 2.
Figure 4:
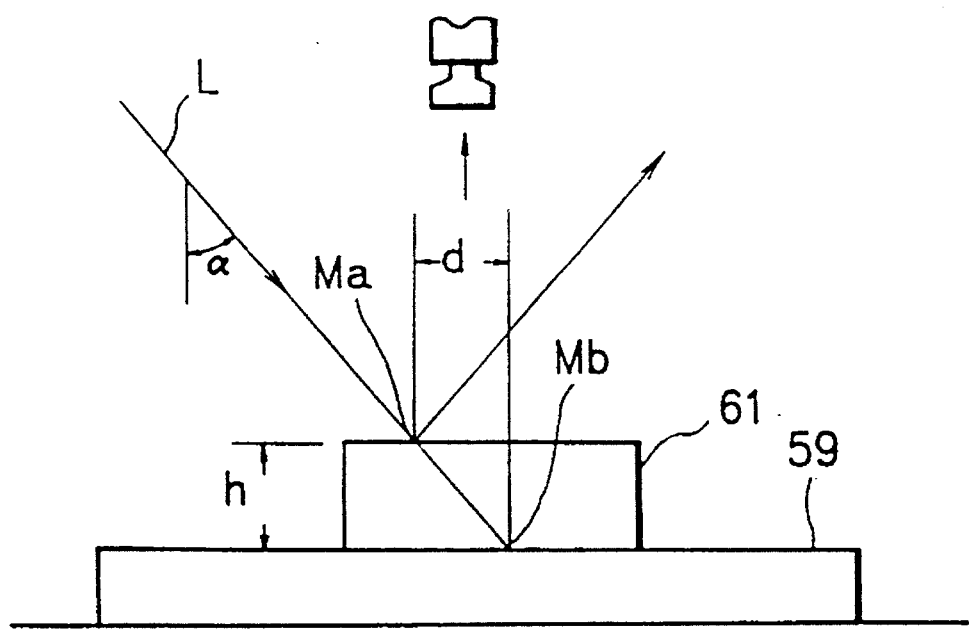
FIG. 4 is a schematic diagram for illustrating the procedure for measuring a height with the use of the image recognition apparatus of FIG. 2.
Figure 5:
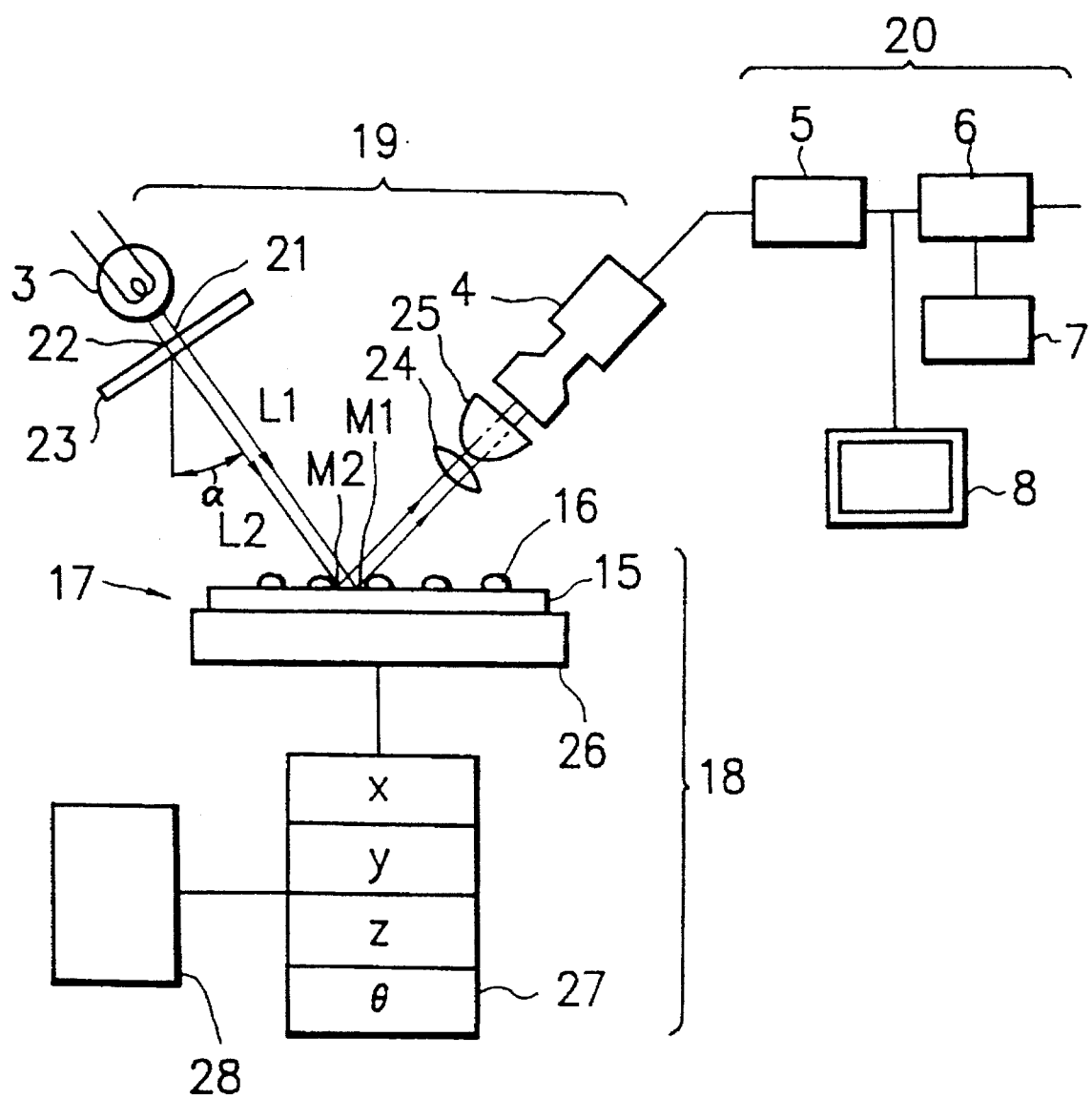
FIG. 5 is a component block diagram for illustrating a form of the image recognition apparatus of the present invention and a mode of the method for inspecting a height with the use of the image recognition apparatus according to the present invention.

FIG. 5 is a conceptual illustration of a form of the image recognition apparatus of the present invention and also of a mode of the method for inspecting the height with the use of the image recognition apparatus according to the present invention. This image recognition apparatus is a device which detects an object to be detected, protrudently disposed on a substrate by means of a television camera and, on the basis of the detection, discriminates whether or not the height of the object to be detected falls within a given range.

This image recognition apparatus comprises an object-to-be-detected supporting member 18 having a semiconductor pellet 17 as an object to be discriminated mounted and supported thereon, an optical system member 19 which not only emits slit incident beams falling on the object to be discriminated but also picks up an image of bright lines produced by the slit beams on the object to be discriminated, and an image processing member 20 which processes the above image by comparing the resultant signal of the image with a standard pattern signal stored in a memory 7.

The object-to-be-detected supporting member 18 comprises a stage 26 having a semiconductor pellet 17 mounted and supported thereon, a drive member 27 which drives the stage 26 in the X, Y, Z and θ directions with respect to an optical system member 19, and a motor control member 28 which moves the drive member 27.

Consequently, the distance of the stage 26 relative to the optical system member 19 can be easily controlled by moving and regulating the stage 26 in the Z direction. Each of the vamp electrodes 16 of the semiconductor pellet 17 mounted on the stage 26 can be moved to a predetermined position by driving the thus controlled stage 26 in the X, Y and θ directions.

The optical system member 19 includes an illuminant 3 which emits slit beams, and a television camera 4 which picks up an image of bright lines produced by the slit beams. These are integrally assembled to compose head means (not shown). The head means is disposed in a fashion such that its position can be regulated opposite and relative to the object-to-be-detected supporting member 18.

The head means composing the optical system member 19 further includes a light screen 23 having two parallel slits 21, 22 formed therein, disposed in front of the illuminant 3, so that mutually parallel slit incident beams L1, L2 fall incident on the semiconductor pellet 17 obliquely at a given angle of $\alpha$, for example 45°. The interval between the slits 21, 22 is, for example, set at $40/\sqrt{2}\mu m$, providing that the slit beams L1, L2 are inclined at an angle of 45°, and that the difference between the upper and lower limit values of the discriminated heights of the vamp electrodes 16 of the semiconductor pellet 17 is 40 μm. The two slit incident beams L1, L2 respectively fall on the semiconductor pellet 17 as upper and lower limit beams L1, L2 respectively positioned at the upper and lower limit values of the discriminated heights of the vamp electrodes 16 of the semiconductor pellet 17. Accordingly, bright lines M1, M2 of the slit beams L1, L2 which are broken in conformity with the heights within the range of discrimination of the vamp electrodes 16 are formed on a semiconductor substrate 15.

The television camera 4 is disposed in the direction of the regular reflection of the slit incident beams L1, L2 falling on the semiconductor substrate 15. A beam-condensing objective lens 24 and a cylindrical lens 25 adapted to effect enlargement in one direction only are disposed in front of the television camera 4, so that an image having an increased magnification in the direction of the width only is picked up of the bright lines M1, M2 produced by the slit beams L1, L2 on the semiconductor substrate 15. Thus, a signal of the image of the bright lines M1, M2 having been enlarged by the cylindrical lens 25 in the direction of the width is fed to an image processing member 20, so that the image advantageously has improved resolution. Further, slit beams having small widths can be employed, so that vamp electrodes 16 as the object to be detected having small heights can also be detected with satisfactory precision.

The image processing member 20 comprises an amplifier 5 adapted to amplify the signal of the image fed from the television camera 4, a comparator 6 adapted to compare the amplified image signal with a standard pattern signal stored in a memory 7, and a display 8 adapted to display the above image signal.

In this embodiment, the vamp-electrode-type semiconductor pellet 17 having a large number of vamp electrodes 16 formed on the semiconductor substrate 15 is used as the object to be discriminated by the image recognition apparatus composed of the above members.

Figure 6:
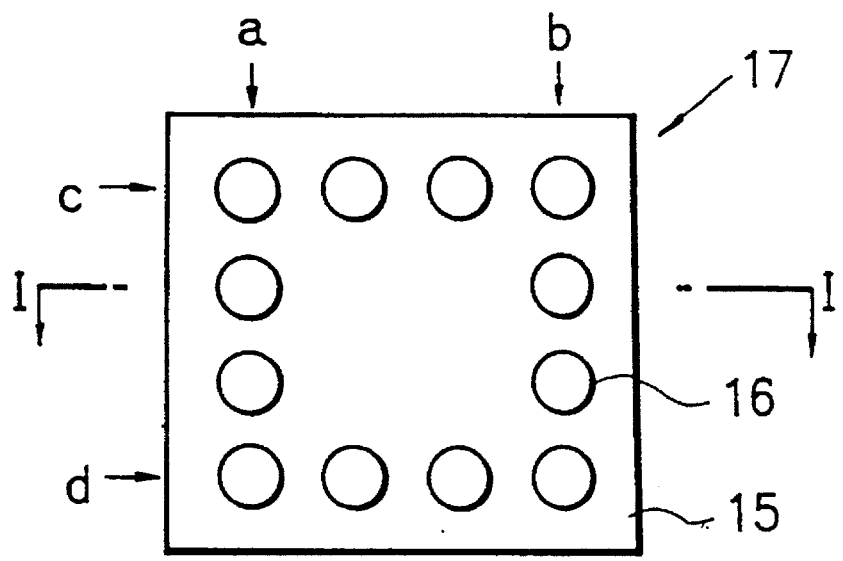
FIG. 6 is a front view of a form of an object to be inspected for use in the Embodiment.
Figure 7:
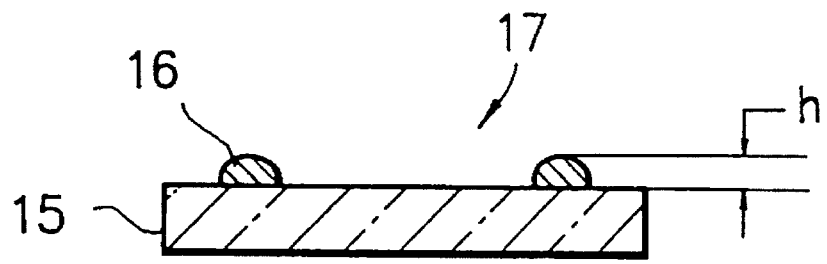
FIG. 7 is a section on the line I—I of FIG. 6.

The structure of the semiconductor pellet 17 is shown in FIGS. 6 and 7. FIG. 6 is a plan, and FIG. 7 is a section on the line I—I of FIG. 6. The above semiconductor pellet 17 shown in the figures is a slice of rectangular quadrangle from a semiconductor wafer (not shown). Many hemispherical vamp electrodes 16 are lined on the periphery of the surface of the semiconductor substrate 15. The vamp electrodes 16 are lapped over and connected to tab leads or printed leads (not shown) of a printed substrate at the time of assembly of the pellet 17. Therefore, the discrimination for causing the dimension of the height (h) of the vamp electrodes 16 from the surface of the substrate to fall in a predetermined range is conducted in order to avoid poor connection to the tab leads or printed leads of a printed substrate in the vamp-electrode-type semiconductor pellet 17.

When the vamp electrodes 16 are measured in the form of a semiconductor wafer (not shown), the semiconductor substrate 15 may suffer from cambering, thereby suffering from a dislocation with respect to the optical system member 19, which leads to an error in height discrimination. However, cambering correction can be conducted by measuring the heights at designated points (for example, five points) on the semiconductor substrate 15 to thereby prepare a wafer camber distribution map and by moving and regulating the stage 26 in the Z direction on the basis of data of the distribution map. The above heights can be measured by the conventional light-section method using the above optical system, or by means of a laser displacement gauge, a contact displacement gauge or noncontact displacement gauge. Alternatively, the heights can be measured by moving and regulating the optical system member 19 along the Z direction.

Figure 8A:
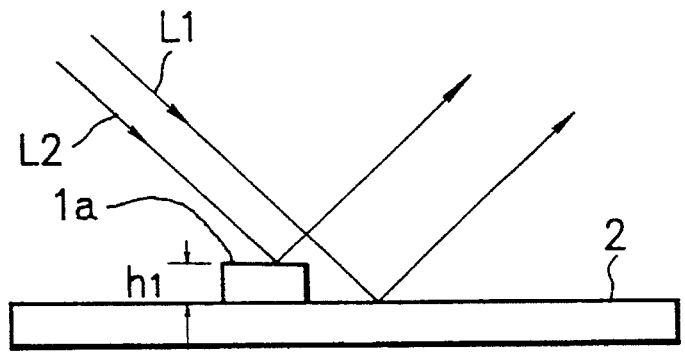
FIG. 8A–8C are views for illustrating the procedure for inspecting a height with the use of the image recognition apparatus of FIG. 5.
Figure 8B:
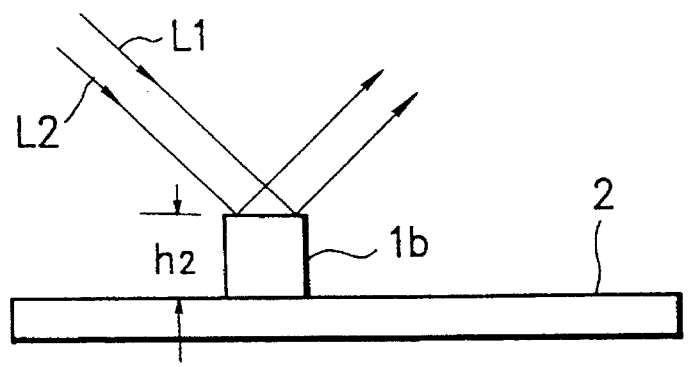
Figure 8C:
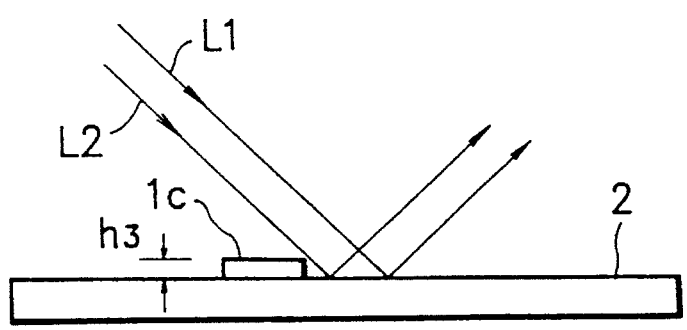

With respect to two mutually parallel slit incident beams obliquely falling on the substrate, their angle and interval are set depending on the upper and lower limit values of the discriminated heights of the objects to be detected. As shown in FIGS. 8A, 8B and 8C, the slit incident beams respectively fall on the objects to be detected 1 as upper and lower limit beams L1, L2 respectively positioned at the upper and lower limit values of the discriminated heights of the objects to be detected 1 protrudently disposed on the substrate 2. In particular, FIG. 8A shows the interception of only slit beam L2 by the object to be detected, FIG. 8B shows the interception of both of slit beams L1 and L2 by the object to be detected, and FIG. 8C shows the noninterception of both of slit beams L1 and L2 by the object to be detected.

Figure 9A:
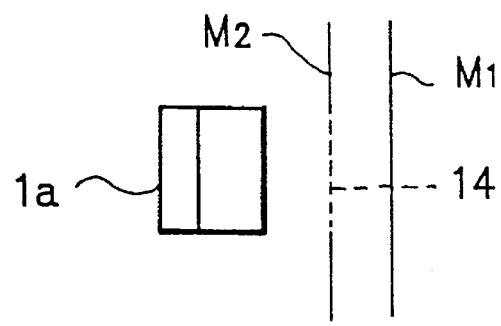
FIG. 9A–9C are views for illustrating the procedure for inspecting a height with the use of the image recognition apparatus of FIG. 5.
Figure 9B:
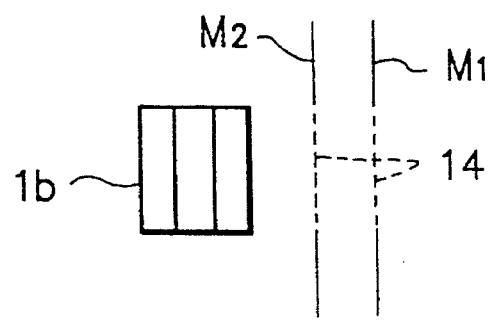
Figure 9C:
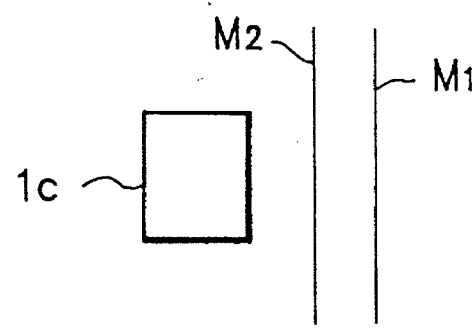

Providing that the height h1 shown in FIG. 8A is of the object to be detected 1a which is within the desirable item range, the bright line M1 produced by the upper limit beam L1 on the substrate 2 is not broken, while the bright line M2 produced by the lower limit beam L2 is broken by the interception by means of the object to be detected 1a, as shown in FIG. 9A. On the other hand, with respect to the objects to be detected 1b and 1c respectively having heights h2 over the desirable item range and h3 below the desirable item range, both of the bright lines M1 and M2 produced by the upper and lower limit beams L1 and L2 on the substrate 2 are broken, and not broken, respectively, as shown in FIGS. 9B and 9C. Therefore, whether or not the height of the object to be detected 1 is within a given range can be discriminated by detecting the presence or absence of any break 14 in the bright lines M1 and M2 on the substrate 2.

The position at which the presence or absence of any break 14 in the bright lines M1 and M2 is detected depends on the relative positions of the object to be detected and the optical system, and is set within an extremely limited narrow area on the substrate 2. The above position detected can automatically be set to thereby automate discrimination operation by previously recording in a memory and setting the position where the object to be detected 1 is arranged on the substrate 2. Further, the range of detection is small and only whether or not there is any break in a bright line is to be discriminated, so that the discrimination speed can be high.

Moreover, widthwise resolution of the image can be improved by widthwise enlarging the image of the bright lines of the slit incident beams falling on the substrate with the use of a cylindrical lens. Hence, slit beams each having a small width can be employed in conformity with the feature of the present invention in which the discrimination accuracy is influenced by the widths of the slit beams, thereby realizing accurate discrimination of the heights of protrudent objects to be detected each having a small height, like vamp electrodes on a semiconductor wafer.

In the present invention, the optical system side or/and the side of the object to be detected are provided with vertical drive means so as to ensure relative move thereof. Thus, height correction is easy even if the objects to be detected are disposed on a substrate which vertically cambers, like vamp electrodes on a semiconductor wafer. Further, the discrimination operation for a large number of objects to be detected, having been lined on the periphery of a substrate, like vamp electrodes on a semiconductor wafer, can efficiently be accomplished by providing means for rotating the side of the objects to be detected to 90° round the optical system side.

With respect to vamp electrodes on a semiconductor wafer or the like, the height discrimination accuracy at the dislocation of the vamp electrodes is higher in the irradiation of the substrate with the slit beams falling at an incident angle of 60° than in the irradiation at an angle of incidence of 45°.

Figure 10:
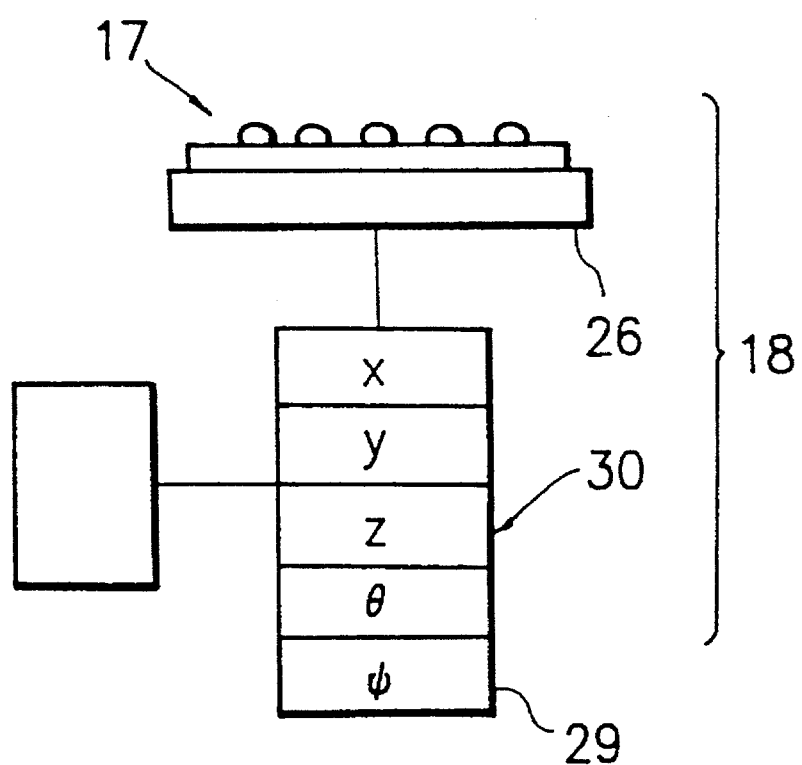
FIG. 10 is a component block diagram for illustrating another form of the image recognition apparatus of the present invention.

FIG. 10 shows a feature of another embodiment of the present invention. The stage-26 driving drive member of the object-to-be-detected supporting member 18 according to the above embodiment of the present invention is provided with rotating means φ 29 to thereby form a drive member 30 which rotates the stage to 90° round the optical system member 19.

In the above structure, the semiconductor pellet 17 as an object to be discriminated can be rotated on the stage 26 to 90° round the optical system member 19. For example, discrimination of the semiconductor pellet shown in FIG. 6 can be performed only by four discriminating operations including discriminating the vamp electrodes 16 disposed on the line indicated by the arrows a, b followed by rotation to 90° and then discriminating the vamp electrodes 16 disposed on the line indicated by the arrows c, d, thereby ensuring efficient discrimination of a large number of objects to be detected, lined on the periphery of a substrate, like vamp electrodes on a semiconductor wafer.

FIG. 11 illustrates the change in performance characteristics caused when the incident angle (α) of the slit incident beam falling on an object to be detected 1 is increased from 45° to 60°. With respect to the two lower limit beams L2, L2' corresponding to the lower limit value h of the height discrimination range for the object to be detected 1, the dislocation of the object to be detected 1 as much as a distance a from the normal position shown by a full line to the illuminant side causes the lower limit value h to be increased by a when the set incident angle is 45° but as small as $a/\sqrt{3}$ when the set incident angle is 60°. Therefore, the setting of the incident angle of the slit incident beam falling on the substrate at 60° ensures an improvement of the height discrimination accuracy at the dislocation of the vamp electrodes over when the incident angle of the slit incident beam is set at 45°.

In accordance with the characteristic feature of the image recognition apparatus and the height measuring method with the use of the image recognition apparatus according to the present invention, two parallel slits are disposed in front of an illuminant emitting irradiation beams so as for oblique slit incident beams to fall on an object to be measured. The slit beams are intercepted by an object to be detected, protrudently disposed on the object to be measured, so that the number of bright lines produced on the surface of the object to be measured is changed depending on the height of the object to be detected. Thus, whether or not the height of the object to be detected falls within a given range can be discriminated by picking up an image of the bright lines on the surface of the object to be measured and comparing the resultant signal of the image with a particular pattern signal previously stored on the basis of specified morphologies of occurrence of various bright lines.

Further, fitting of a cylindrical lens increases the resolution of the image recognition apparatus. Fitting of a stage having an object to be measured mounted thereon facilitates the measurement of a plurality of points, and adjusting of the angle of the stage permits discrimination among a plurality of objects to be detected.

As apparent from the above, the characteristic feature of the image recognition apparatus and the height measuring method with the use of the image recognition apparatus according to the present invention resides in that an object to be measured is irradiated with two oblique mutually parallel slit beams, an image of bright lines produced on the object to be measured is picked up and the resultant signal of the image is compared with a particular pattern signal previously stored on the basis of specified morphologies of occurrence of various bright lines. Thus, whether or not the height of an object to be detected falls within a given range can be discriminated by the above comparison.

Further, fitting of a cylindrical lens improves the resolution of the image recognition apparatus. Fitting of a stage having an object to be measured mounted thereon facilitates the measurement of a plurality of points, and adjusting of the angle of the stage permits discrimination among a plurality of objects to be detected. The discrimination of the height of the object to be detected can be rapidly effected due to comparative discrimination processing. Moreover, the enlargement of the image of bright lines along the width direction thereof by means of the cylindrical lens permits discrimination with excellent sensitivity among small objects to be detected, such as vamp electrodes for use on a semiconductor wafer.

The above illustrates preferred embodiments of the present invention, which should not be construed as limiting the present invention. Various changes and modifications can be made thereto as long as the subject matter of the present invention is not departed. For example, whilst use is made of two slit beams in the above embodiments, it is feasible to increase the resolution of measurement by the use of at least three slit beams.

What is claimed is:

1. An image recognition apparatus having a coordinate system associated therewith, the apparatus comprising:

illuminant means for emitting a flux of rays of light;

slit means for converting the flux of rays of light into a combination of first and second slits of light parallel to each other and incident on an inspection object at a variable oblique angle, the first and second slits of light scanning the inspection object;

image pickup means for picking up an image of first and second bright lines made by the first and second slits of light, respectively, on a surface region which the inspection object has in a local domain of the coordinate system; and image processing means for comparing and collating the picked-up image with a stored image representative of a pattern showing a presence and an absence of the first and second bright lines on the surface region of the inspection object in the local domain of the coordinate system so that, for a height of a convex shape on the surface region, a conformity is determined based on a broken one of the first and second bright lines and a discrimination is made between a first non-conformity due to the height of the convex shape being greater than a first height and a second non-conformity due to the height of the convex shape being less than a second height, based on an order in which the first and second bright lines are broken, as the first and second slits of light correspond to upper and lower limits of the conformity, respectively.

2. The image recognition apparatus as claimed in claim 1, wherein the image pickup means has a cylindrical lens for magnifying the image of the first and second bright lines to be picked up, in a width direction of the first and second bright lines.

3. The image recognition apparatus as claimed in claim 1, wherein the height of the convex shape is calculated based on a widthwise distance between line segments of one of the first and second bright lines, as it is broken by the convex shape and picked up by the image pickup means.

4. The image recognition apparatus as claimed in claim 1, wherein the first height is greater than the second height.

\* \* \* \* \*